United States Patent [19]

Kuroda et al.

[11] Patent Number: 5,546,374
[45] Date of Patent: Aug. 13, 1996

[54] INFORMATION RECORDING AND/OR REPRODUCING APPARATUS USING PROBE

[75] Inventors: Ryo Kuroda, Kawasaki; Takahiro Oguchi, Yamato, both of Japan

[73] Assignee: Canon Kabushiki Kaisha, Tokyo, Japan

[21] Appl. No.: 311,856

[22] Filed: Sep. 26, 1994

[30] Foreign Application Priority Data

Sep. 29, 1993 [JP] Japan .................................. 5-242582

[51] Int. Cl.$^6$ ........................................................ G11B 9/00
[52] U.S. Cl. ............................ 369/126; 365/118; 250/306
[58] Field of Search .................................... 369/126, 124,
369/116, 100, 99; 365/118, 157, 174; 250/306

[56] References Cited

U.S. PATENT DOCUMENTS

| | | | |
|---|---|---|---|
| 4,343,993 | 8/1982 | Binnig et al. | |
| 4,575,822 | 3/1986 | Quate . | |
| 4,724,318 | 2/1988 | Binnig . | |
| 4,829,507 | 5/1989 | Kazan et al. | 369/126 |
| 4,907,195 | 3/1990 | Kazan et al. | 365/118 |
| 5,329,122 | 7/1994 | Sakai et al. | 250/306 |
| 5,418,363 | 5/1995 | Elings et al. | 250/306 |
| 5,432,771 | 7/1995 | Shido et al. | 369/126 |

FOREIGN PATENT DOCUMENTS

| | | |
|---|---|---|
| 63-161552 | 7/1988 | Japan . |
| 63-161553 | 7/1988 | Japan . |
| 01245445 | 9/1989 | Japan . |
| 04321955 | 11/1992 | Japan . |
| 05040968 | 2/1993 | Japan . |

OTHER PUBLICATIONS

*Proceedings of the IEEE*, Kurt E. Petersen, "Silicon as a Mechanical Material", vol. 70, No. 5, pp. 420–457, May 1982.

*Primary Examiner*—Loha Ben
*Attorney, Agent, or Firm*—Fitzpatrick, Cella, Harper & Scinto

[57] ABSTRACT

An information recording and/or reproducing apparatus records and reproduces information with probes. The apparatus includes probes made of an elastic body, a recording medium which oxidizes in portions where an electric current flows in the atmosphere to form recording bits, a device for moving the probes relative to the recording medium, and a device for applying a recording voltage between the probes and the recording medium for forming the recording bits.

23 Claims, 10 Drawing Sheets

INFORMATION RECORDING AND/OR REPRODUCING APPARATUS USING PROBE

BACKGROUND OF THE INVENTION

1. Field of the Invention

The present invention relates to a high-density recording and/or reproducing apparatus applying a scanning probe microscope, and more particularly to an information recording and/or reproducing apparatus for recording and/or reproducing information with probes being in contact with a recording medium.

2. Description of the Related Art

Recently developed is a scanning tunneling microscope (hereinafter referred to as STM) with which a surface of a conductive material can be observed with a resolution below nanometers, as described in U.S. Pat. No. 4,343,993. Such STM is used to observe an arrangement of atoms on a surface of a metal or a semiconductor, orientation of an organic molecule, etc. in the atomic or molecular scale. Developing the STM technology, an atomic force microscope (hereinafter referred to as AFM) which could observe surfaces of insulating materials, etc. with the same resolution as that of STM was also developed (U.S. Pat. No. 4,724,318).

Applying the principle of the STM, such techniques are proposed that a probe is made to gain access to a recording medium in the atomic or molecular scale and that in that state recording and/or reproduction is carried out, achieving a high-density memory (U.S. Pat. No. 4,575,822 and Japanese Laid-open Patent Application No. 63-161552 and No. 63-161553).

Further, concerning a high-density memory and a structure of an apparatus being a combination of STM with AFM, there are proposed a recording and/or reproducing apparatus in which STM structure is used to apply a voltage between a tip and a recording medium so as to effect recording and AFM structure is used to detect the shape of recording bits so as to effect reproduction, a recording and/or reproducing apparatus in which the principle of AFM is applied to control a position of a tip in recording and in reproduction, and a recording and/or reproducing apparatus in which a tip is arranged to trace the surface of the recording medium in recording and in reproduction, utilizing deformation of an elastic member supporting the tip (Japanese Laid-open Patent Application No. 1-245445, No. 4-321955, and No. 5-040968, which matured from Japanese Application No. 3-194124).

Among the above conventional examples, the recording and/or reproducing apparatus having the arrangement of an apparatus in combination of STM with AFM is so arranged that recording or reproduction is performed with the tip being in contact with the recording medium. Where a voltage for recording is applied between the tip and the recording medium while keeping the tip in contact with the recording medium, an electric current flowing during recording sometimes breaks the tip, because it is difficult to control a value of the flowing current in the contact state. In addition, because of the contact arrangement between the tip and the recording medium, there are cases where a fragment of the recording medium is deposited on the tip due to the breakage in recording. As a result, the tip is contaminated, which caused problems of decreasing the resolving power of the tip, decreasing the conductivity of the tip, and decreasing the reliability of recording or reproduction. The present invention has been accomplished to solve the above problems.

SUMMARY OF THE INVENTION

The above object can be achieved by an information recording and/or reproducing apparatus for recording and reproducing information with a probe, comprising:

a probe made of an elastic body;

a recording medium which oxidizes in a portion where an electric current flows in the atmosphere to form a recording bit;

means for relatively moving said probe relative to said recording medium; and means for applying a recording voltage for forming the recording bit, between said probe and said recording medium.

The details will be described in the description of embodiments.

BRIEF DESCRIPTION OF THE DRAWINGS

FIG. 1A is a drawing to show a recording medium and a probe tip and FIG. 1B is a drawing to show a state in which a voltage is applied between the recording medium and the probe tip;

FIG. 2A is a drawing to show a recording medium and a probe tip and FIG. 2B is a drawing to show a state in which a voltage is applied between the recording medium and the probe tip;

DETAILED DESCRIPTION OF THE PREFERRED EMBODIMENTS

The following describes preferred embodiments of the information recording and/or reproducing apparatus of the present invention and the recording and reproducing methods with the apparatus with reference to FIG. 1A to FIG. 11.

The recording medium used in the present invention is made of a material which locally oxidizes at the surface of the recording medium by an electric current locally flowing between the probe tip and the recording medium upon application of a voltage through the probe. Such a material is, for example, Si, GaAs, Ti, W, Zn, etc. These materials are resistant to breakage upon application of voltage.

Figure 3:
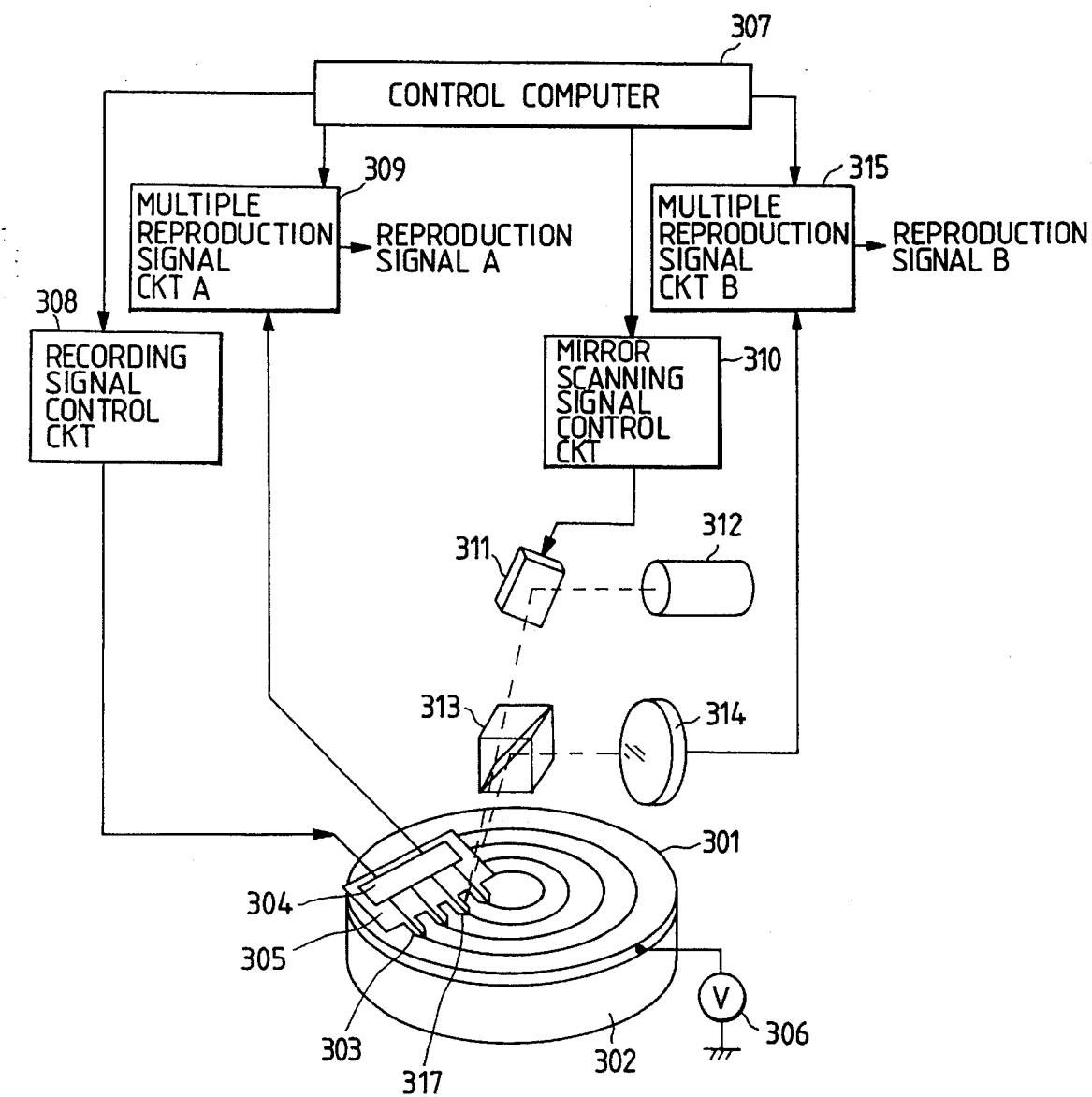
FIG. 3 is a drawing to illustrate a specific arrangement of the information recording and/or reproducing apparatus of the present invention.

FIG. 3 shows a specific arrangement of the information recording and/or reproducing apparatus used in the present invention. In FIG. 3, reference numeral 301 denotes a disk recording medium, and 302 a motor for rotating the disk recording medium 301. On a substrate of multi-probe unit 305 there is integrally formed a plurality of probes 303 each having a conductive tip 317, which opposes a plurality of recording regions on the disk recording medium 301 to record or reproduce information in parallel, a paralleling and multiplexing circuit 304 for paralleling and multiplexing recording or reproducing signals in the plurality of probes 303, and electric circuits such as wiring. A bias voltage applying circuit 306 is electrically connected with the disk recording medium 301 in order to apply a bias voltage thereto in recording or in reproduction.

The multi-probe unit 305 is produced on the substrate, for example, of Si, using micromachining techniques such as those called micromechanics (for example, as described in Petersen, Proc. IEEE, vol. 70, p. 420, 1982) or the microelectronics techniques for producing LSIs or the like. Specifically, peripheral electric circuits including the paralleling and multiplexing circuit are first produced on a Si wafer. With this Si wafer, the photolithography is then conducted to produce the plurality of conductive tips 317 for applying a voltage and for detecting an electric current, provided at the plurality of probe tips, and electric wiring patterns, and to pattern the shape of cantilevers. Finally, anisotropic etching of Si is conducted with a KOH solution to form a plurality of cantilever structures, and the wafer is cut into separate multi-probe units.

Here, a material for the tip is a substance resistant to oxidation with flow of electric current, for example, one selected from noble metals such as Au, Pt, etc.

The following describes transmission of recording signals for recording information with the plurality of probes 303 in the disk recording medium 301. Based on a control signal from a control computer 307, recording signals from a recording signal control circuit 308 are supplied to the paralleling and multiplexing circuit 304. The paralleling and multiplexing electric circuit 304 parallels the recording signals, based on a paralleling control signal from the control computer 307, to apply a plurality of paralleled recording signals to the plurality of probes 303. With the plurality of recording signals information is recorded in parallel into the disk recording medium 301 at the respective probes 303.

Figure 1A:
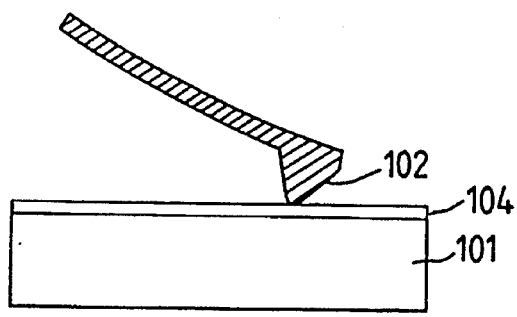
FIGS. 1A and 1B are conceptual drawings to illustrate the principle of the first embodiment of a recording method in an information recording and/or reproducing apparatus of the present invention, where
Figure 1B:
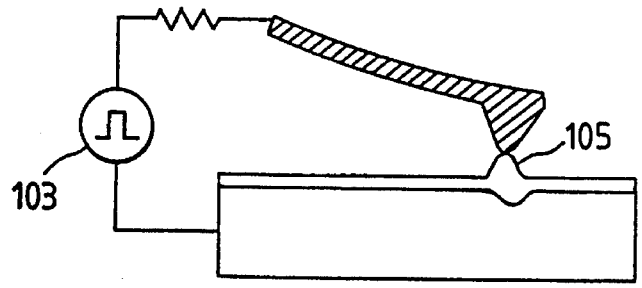

FIGS. 1A and 1B show the first embodiment of a recording method in the information recording and/or reproducing apparatus of the present invention. The recording medium 101 is made of such a material as described above. While the probe tips 102 are kept in contact with the surface of the recording medium in the atmosphere, a voltage is applied between the recording medium and the probe tips by a voltage applying unit 103. The surface of the recording medium 101 is covered with a naturally oxidized film 104 in the thickness of about several layers of surface atoms in the atmosphere. When an electric current flows in a portion contacting a probe tip, Joule heat generated promotes local oxidation on the surface of the recording medium. This local oxidation causes the substance making the recording medium to take in more oxygen from the atmosphere, thus increasing the film thickness of the oxide layer 104 to increase the volume. The increase in volume locally changes the shape of the surface into a projected shape, thus forming a recording bit 105.

Consider an example in which the recording medium is made of Si and recording or reproduction is conducted with the recording medium of Si, which will be described below in detail. A 2-inch epitaxially-grown Si wafer was used as a disk recording medium for the information recording and/or reproducing apparatus as shown in FIG. 3. The crystallographic axis of plane was (111). The substrate Si was of Sb-doped n-type and had a resistivity of 0.01 $\Omega$.cm. An epitaxial layer Si grown on the substrate Si was of P-doped n-type and had a resistivity of 5 $\Omega$.cm. This Si wafer was immersed in a 10% HF solution for five seconds to remove the naturally oxidized film on the surface. It is known that this treatment can terminate dangling bonds of Si exposed in the Si surface with H (hydrogen) whereby the Si surface forms a stable structure hardly oxidized in the atmosphere. This treatment should be preferably conducted to avoid a problem of unstable recording due to an insufficient current in recording with a too thick oxide film. The reason why the (111)-axis epitaxially-grown Si wafer was used is that it has better surface flatness in the level of the size of recording bits after the HF treatment as compared with other si wafers ((100)-axis wafers and wafers produced by the FZ method or by the CZ method).

Recording and reproduction of information was carried out with such a Si wafer mounted as a disk recording medium in the apparatus as shown in FIG. 3. Keeping the tip of the probes in contact with desired positions on the recording medium and applying a voltage pulse of 4 V and 10 µs between the tips and the recording medium, recording bits each having a projection of 1 nm in height and 30 nm in diameter were formed with good reproducibility. When recording was carried out changing the crest value and the time width of the applied voltage pulses, the height and the diameter of recording bits were able to be changed. For example, a voltage pulse of 4 V and 100 ms formed a recording bit of 10 nm in height and 100 nm in diameter. With voltage pulses below the crest value of 2 V, no practically reproducible recording bit was formed in respect of the S/N ratio. Over the crest value of 5 V, a provability of occurrence of breakage of the probe tips due to an electric field or the Joule heat increased. It was thus found that the crest value was preferably in the range of 2 to 5 V.

Here, the contact resistance of the surface increases in portions of the recording bits because the thickness of the Si surface oxide film increases there. Applying a bias voltage of 1 V between the tips and the Si recording medium, electric currents flowing between the tips and the Si recording medium were detected. For the non-recorded Si surface after the HF treatment, the electric currents were 100 nA and the contact resistances were 10 MΩ; for the above recorded portions the electric currents flowing were not more than 1 nA and the contact resistances increased to be not less than 1 GΩ.

Further, the capacitance of the surface chances in the portions of the recording bits because the thickness of the Si surface oxide film changes there. Applying high-frequency signals of frequency 1 GHz and amplitude 1 V between the tips and the Si recording medium, electrostatic capacity was measured between the tips and the Si recording medium. Then the electrostatic capacity was $10^{-15}$ F for the non-recorded Si surface after the HF treatment, while it reduced to be not more than $10^{-16}$ F for the above recorded portions.

Figure 2A:
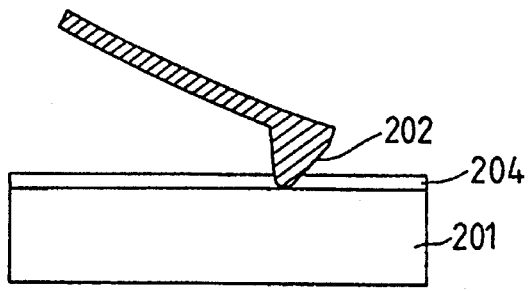
FIGS. 2A and 2B are conceptual drawings to illustrate the principle of the second embodiment of the recording method in the information recording and/or reproducing apparatus of the present invention, where
Figure 2B:
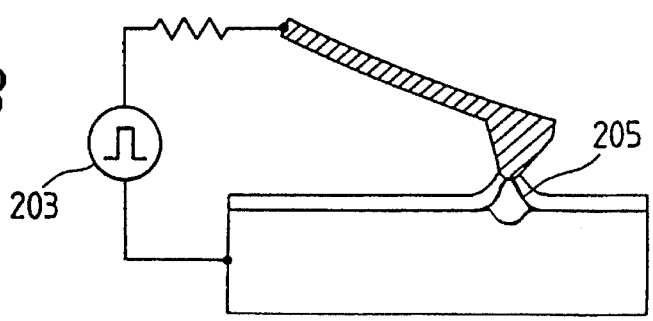

FIGS. 2A and 2B show the second embodiment of the recording method in the information recording and/or reproducing-apparatus of the present invention. The recording medium 201 is made of such a material as described previously. While the probe tips 202 are kept in contact with the surface of the recording medium in the atmosphere, a voltage is applied by the voltage applying device 203 between the recording medium and the probe tips with the recording medium as an anode. When an electric current flows in portions where the probe tips contact the recording medium, anodic oxidation promotes local oxidation on the surface of the recording medium. The oxidation of this type requires existence of $H_2O$. Since water is normally adsorbed on the surface of substance in the atmosphere, this water 204 adsorbed on the surface of the recording medium contributes to the anodic oxidation. In the anodic oxidation the substance forming the recording medium takes in oxygen produced by decomposition of the adsorbed water 204, thus increasing the volume to locally change the shape of the surface into a projected shape and thereby to produce a recording bit 205. The chemical reaction occurring here can be represented by the following formula with expression of M for the substance for the recording medium.

$$M + nH_2O \rightarrow MOn + 2nH^+ + 2ne^-$$

Consider an example where the recording medium is made of Ti and recording and reproduction is carried out with the recording medium of Ti, which will be described below in detail. A disk recording medium for the image recording and/or reproducing apparatus as shown in FIG. 3 was prepared by vapor-depositing Ti on a 2-inch Si wafer in the film thickness of 10 nm. Recording and reproduction of information was carried out with such a disk recording medium, the Ti thin film on the Si wafer, mounted in the apparatus shown in FIG. 3. Keeping the tips of the probe tips in contact with desired positions on the recording medium and applying a voltage pulse of 4 V and 30 μs between the tips and the recording medium with the recording medium as an anode, recording bits having a projected shape of 2 nm in height and 20 nm in diameter were formed with good reproducibility. When recording was carried out changing the crest value and the time width of the applied voltage pulses, the height and the diameter of recording bits were able to be changed. For example, a voltage pulse of 7 V and 10 ms formed a recording bit of 5 nm in height and 50 nm in diameter. With voltage pulses below the crest value of 2 V, no practically reproducible recording bit was formed in respect of the S/N ratio. Over the crest value of 8 V, a provability of occurrence of breakage of the probe tips due to an electric field or the Joule heat increased. It was thus found that the crest value was preferably in the range of 2 to 8 V.

Since the Ti surface changes into Ti oxide in the portions of recording bits, the contact resistance of the surface also changes there. Applying a bias voltage of 1 V between the tips and the Ti recording medium with the tips as anodes, electric currents flowing between the tips and the Ti recording medium were detected. For the non-recorded Ti surface, the electric currents flowing were 1 nA and the contact resistances were 1 GΩ, while for the recorded portions the flowing currents were not more than 100 pA and the contact resistances increased to be not less than 10 GΩ.

Further, the capacitance of the surface also changes in the portions of recording bits because the Ti surface changes into the Ti oxide there. Applying high-frequency signals of frequency 1 GHz and amplitude 1 V between the tips and the Ti recording medium, capacitive reactances were measured between the tips and the Ti recording medium. Then the capacitive reactances were $10^{-16}$ F for the non-recorded Ti surface, while they reduced to be not more than $10^{-17}$ F for the recorded portions.

As a reproducing method for reproducing these recording bits described in the first and second embodiments of the recording method, there are (1) a method for electrically detecting an increase in contact resistance of the surface (decrease in conductivity) or a decrease in capacitance, utilizing the fact that a locally oxidized portion increases the contact resistance (or decreases the conductivity) or decreases the capacitance, and (2) a method for detecting the projection structure of recording bits using the principle of AFM.

The first electrical reproduction method is a method for reproducing the recording bits, based on values of electric currents flowing between the probes and the recording medium through the contact resistance or the capacitance of recording bits. In the electrical reproduction method, transmission is performed as follows for reproduction signals picked up by the plural probes 303 shown in FIG. 3 from the disk recording medium 301. First, the plurality of probes 303 reproduce information in parallel from the disk recording medium 301 to obtain a plurality of respective reproduction signals. The reproduction signals are supplied to the paralleling and multiplexing circuit 304. Further, the paralleling and multiplexing circuit 304 multiplexes the reproduction signals, based on a multiplexing control signal output from the control computer 307. The thus multiplexed reproduction signals are sent to a multiple reproduction signal circuit A (309).

The second reproduction method based on the projection detection employs the principle of AFM. The probes each are made of an elastic body. Reproduction is effected by detecting an amount of deformation of each elastic body due to an interatomic force or an intermolecular force acting between the surface of the recording medium and the probe or by detecting deformation of each elastic body occurring at a recording bit having the projected shape. Specifically, the multi-probe unit 305 shown in FIG. 3 is further provided with means for detecting an amount of deflection of each probe 303 having the cantilever structure, and outputs from the deflection amount detecting means are used as the reproduction signals.

A possible means for detecting the amount of deflection for each of the probes may be the means for detecting an amount of deflection of cantilevers (corresponding to the probes in the present embodiment), of the optical lever type as described, for example, in Japanese Laid-open Patent Application No. 4-321955, in which an optical beam for detecting the deflection amount scans the plurality of cantilevers to successively detect an amount of deflection for each of the plural cantilevers. In FIG. 3, a scanning mirror 311 is driven by a drive signal output from a mirror scanning signal control circuit 310, based on a control signal from the control computer 307, so that light from a laser 312 is successively projected onto the plurality of probes 303. Reflected light from the plurality of probes 303 is guided to be reflected by a beam splitter 313 and then to enter a position detector 314. The position detector 314 outputs a reflected light spot position signal. Deflection amounts of the probes can be successively detected by detecting the reflected light spot position signal while splitting it at the timing of drive of the scanning mirror 311. The reflected light spot position signal is a signal in which the reproduction signals from the probes are multiplexed, which is sent to a multiple reproduction signal circuit B (315).

Here, the means for detecting the deflection amounts of the plurality of probes 303 may be another optical detecting means such as an optical interferometer, or an integral arrangement of a plurality of probe deflection detecting means, for example, of electrical detecting means such as piezoelectric sensors, strain resistance sensors, etc., with the probes.

Either one of the electrical detection means and the projection shape detecting means as described above can be employed alone as the reproduction method in the information recording and/or reproducing apparatus of the present invention. However, if the method for detecting the contact resistance of recording bits is to be selected among the electrical detection methods, the oxidation of the surface of the recording medium would be somewhat promoted, though not changing the recording state. Thus, the value of contact resistance of the surface could increase so as to increase the resistance to the flow of the electric current. Because of this, the S/N ratio of the recording bit detection signal would decrease with repetition of reproduction. If no flow of electric current should result, an electric current could be made to flow by increasing the bias voltage applied between the tips and the recording medium. However, increasing the voltage too much would change the recording state, which is not preferable.

With the projection shape detecting method, the S/N ratio of the recording bit detection signal would decrease if the surface of the recording medium were too rough, because the height of the recording bits are not far greater than asperities of the surface of the recording medium. Under such circumstances, the reduction of the S/N ratio can be avoided, employing the method as described below for the detection of the recording bits.

A first reproduction method with high S/N ratio is so arranged that reproduction signals are obtained by combining the detection signals from the electric current in the recording bits with the detection signals from the projection shape, as shown in FIG. 3.

Figure 4:
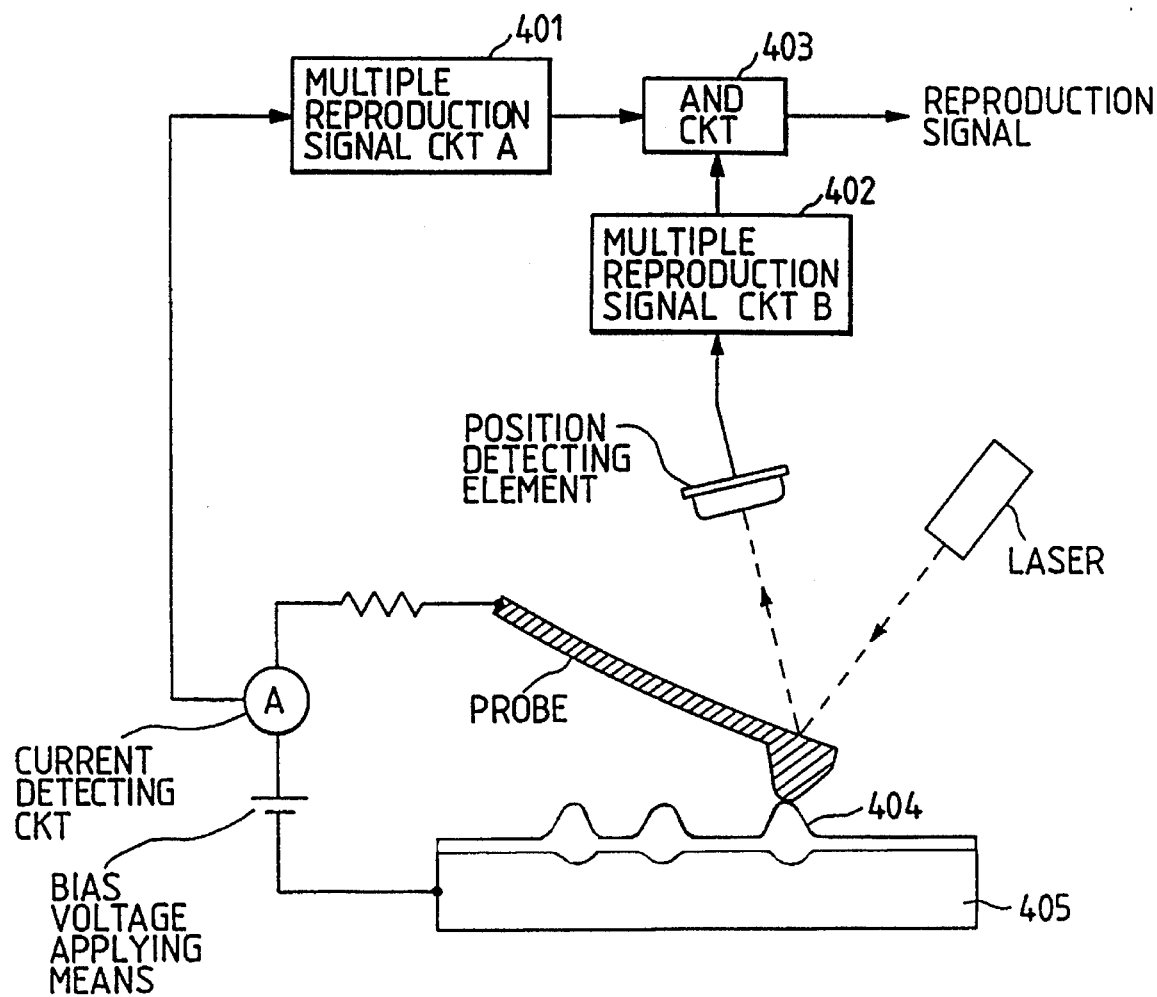
FIG. 4 is a drawing to illustrate the first embodiment of a reproducing method with high S/N ratio in the information recording and/or reproducing apparatus of the present invention.

FIG. 4 shows the detailed transmission of signals in this method. The detection signals by the electric currents are sent to a multiple reproduction signal circuit A (401) while the detection signals by the projection shape to a multiple reproduction signal circuit B (402). Reproduction signal A and reproduction signal B output from the multiple reproduction signal circuits A (401) and B (402), respectively, are put into an AND circuit 403. Only when an output from the AND circuit is true, that is, only when a recording bit 404 is detected in the both reproduction signals at a time, it is recognized as a correct recording bit.

This method realized reproduction with high S/N ratio by the combination of the projection shape signals with the detection signals by the electric currents (reproduction signals by values of contact resistance) even if the surface of the recording medium 405 is so rough as to make it difficult to discriminate the projection shape of recording bits from the rough surface of the recording medium.

Figure 5:
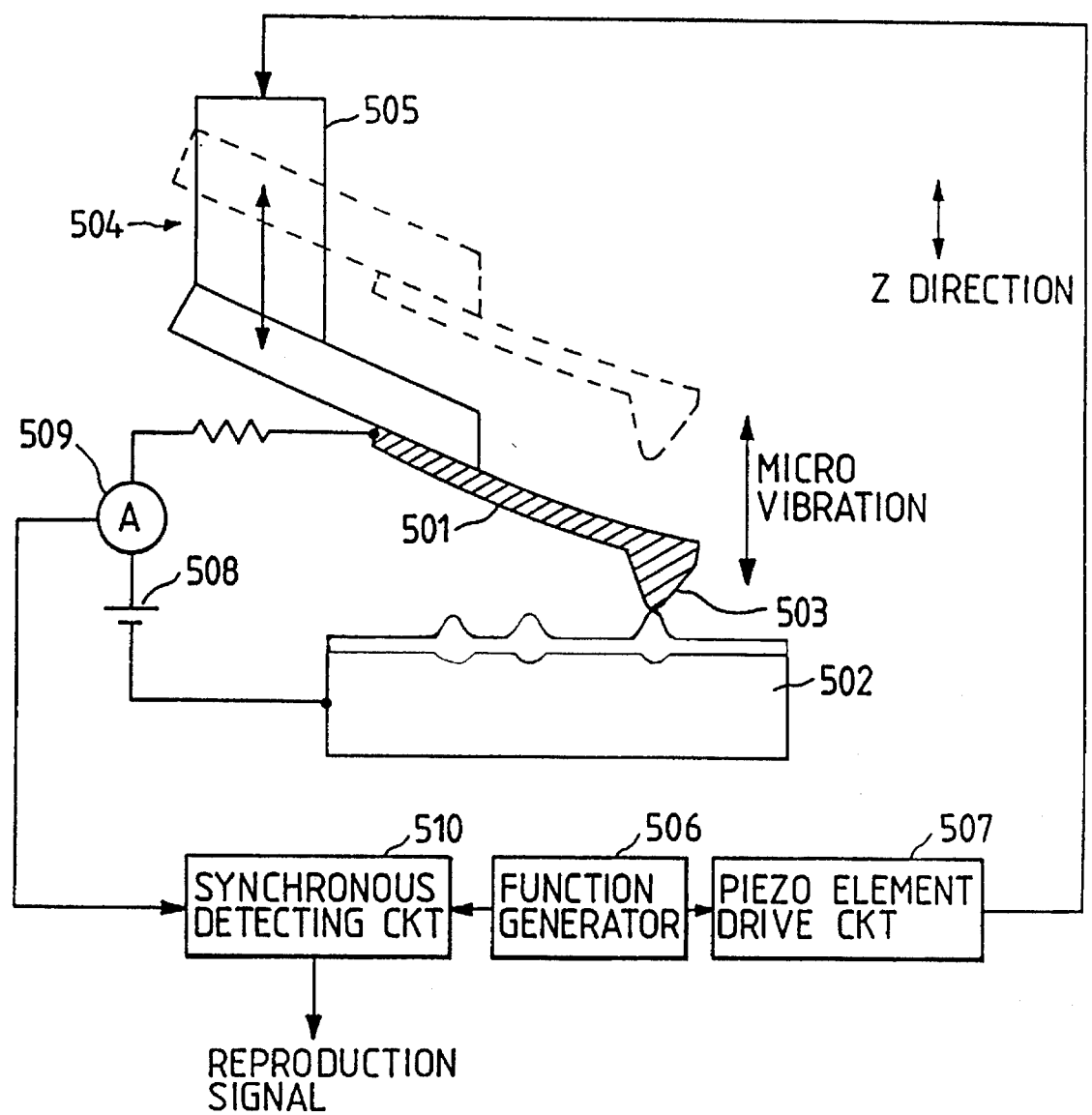
FIG. 5 is a drawing to illustrate the second embodiment of a reproducing method with high S/N ratio in the information recording and/or reproducing apparatus of the present invention.

A second reproduction method with high S/N ratio is so arranged, as shown in FIG. 5, that the probes 501 are finely vibrated in directions perpendicular to the recording medium 502 and electric currents are detected while the tips 503 are kept in contact with the recording medium 502, to reproduce information.

Specifically, a piezo element 505 is attached to a multi-probe unit 504 to vibrate it with fine amplitude of about 100 nm in the z-direction in FIG. 5. By this vibration a clearance between the multi-probe unit 504 and the recording medium 502 is so set that the tips 503 vibrate between a contact state and a non-contact state with the recording medium 502. The piezo element 505 is driven with application of a drive signal from a piezo element drive circuit 507, based on a signal from a function generator 506. Applying a bias voltage between the tips 503 and the recording medium 502 by a bias voltage applying means 508, electric currents flowing between the tips and the recording medium are detected by a current detecting circuit 509. Detected signals of the electric currents are subjected to synchronous detection in a synchronous detection circuit 510 to be synchronized with a piezo element drive signal from the function generator 506, thus obtaining reproduction signals.

This method was able to detect surface resistance of the recording medium 502 with flow of electric currents between the probes 501 and the recording medium 502 only when the tips 503 were in contact with the recording medium 502, thereby decreasing values of currents flowing in reproducing the recording bits on a time average basis. This made possible reproduction with high S/N ratio but without promotion of the oxidation of the recording medium.

Figure 6:
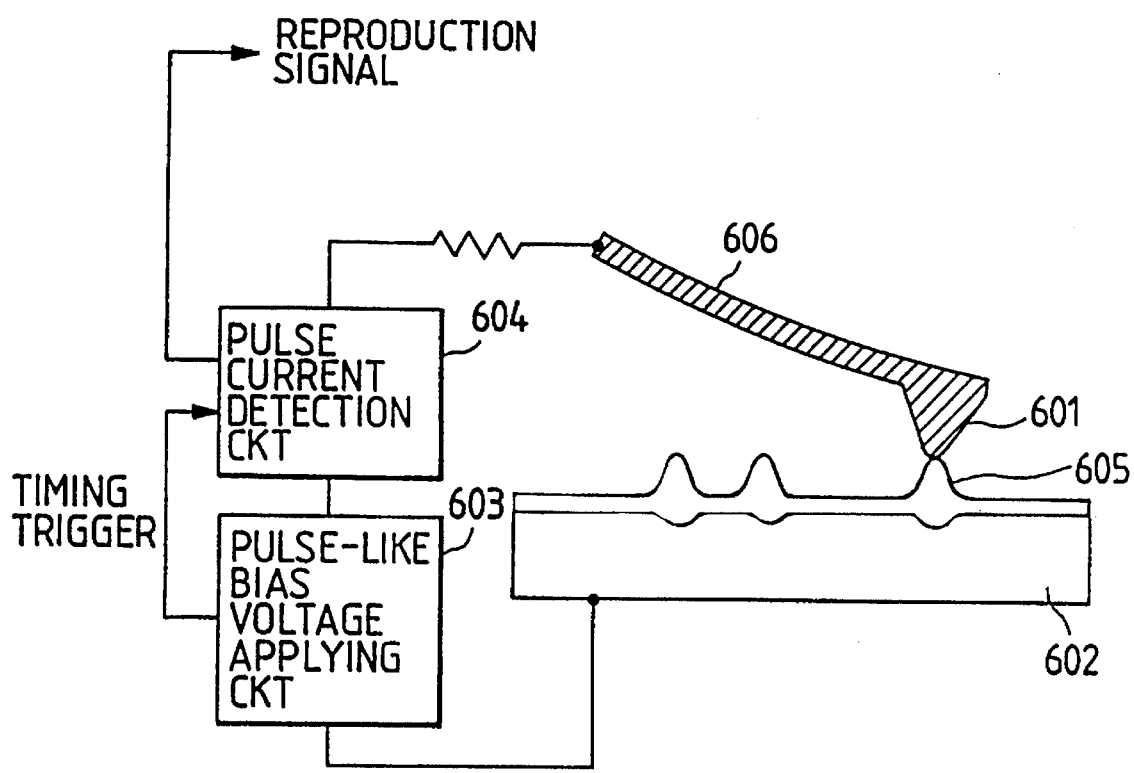
FIG. 6 is a drawing to illustrate the third embodiment of a reproducing method with high S/N ratio in the information recording and/or reproducing apparatus of the present invention.

The third reproduction method with high S/N ratio is so arranged, as shown in FIG. 6, that a pulselike voltage is applied between the probes and the recording medium and electric currents flowing at the instant of application of the voltage are detected to reproduce information.

Specifically, the pulselike bias voltage is applied between the tips 601 and the recording medium 602 by a pulselike bias voltage applying circuit 603. Here, the "pulselike bias voltage" means lower-voltage pulses as compared with the recording pulse voltage. Receiving a timing trigger from the pulselike voltage applying circuit 603, a pulse current detecting circuit 604 detects pulse currents flowing through the recording bits 605 to output them as reproduction signals.

According to this method, the surface resistance of the recording medium 602 could be detected by making an electric current flow between the probe 606 and the recording medium 602 only when the reproduction pulse voltage is applied between the tip 601 and the recording medium 602, whereby the method was able to decrease values of electric currents flowing in reproducing the recording bits on a time average basis. As a result, this method made possible reproduction with high S/N ratio but without promotion of the oxidation of the recording medium.

Figure 7:
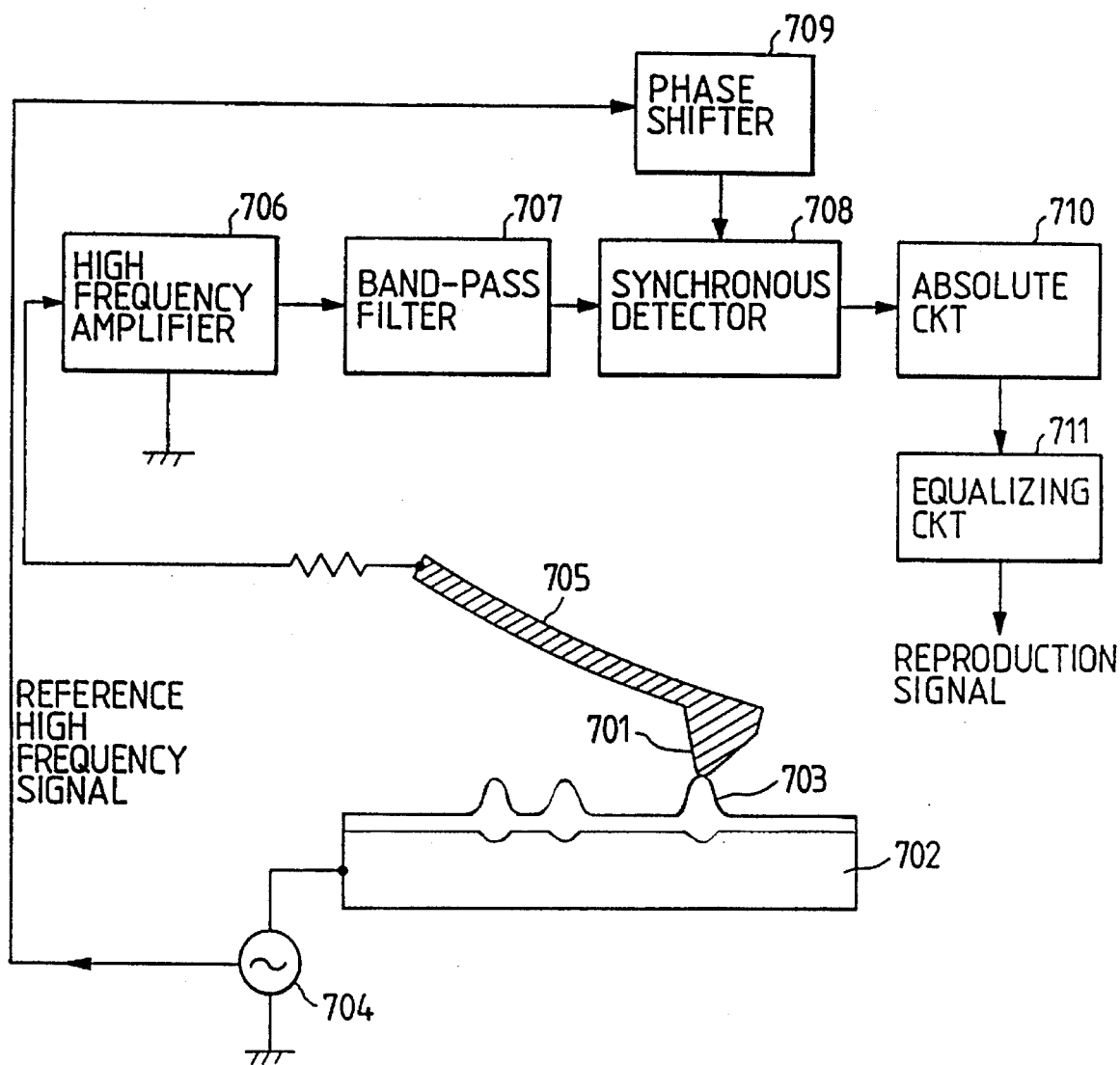
FIG. 7 is a drawing to illustrate the fourth embodiment of a reproducing method with high S/N ratio in the information recording and/or reproducing apparatus of the present invention.

The fourth reproduction method with high S/N ratio is so arranged, as shown in FIG. 7, that the recording bits 703 are detected by measuring the electrostatic capacity between the tips 701 and the recording medium 702. There is a change in electrostatic capacity of the surface of the recording medium in the portions of recording bits, which is detected.

Specifically, a high-frequency signal applying circuit 704 applies a high-frequency signal of the amplitude of low voltage of about 1 V and the frequency of about 1 GHz between the tips 701 and the recording medium 702, which is detected by the probes 705. The high-frequency signal detected is passed through a high-frequency amplifier 706 and a band-pass filter 707 and thereafter is subjected to synchronous detection with a reference high-frequency signal in a synchronous detector 708 to be detected with high sensitivity. The reference high-frequency signal from the high-frequency signal applying circuit 704 is passed through a phase shifter 709, where the phase of the signal is delayed 90°, and thereafter is put into the synchronous detector 708. The reason why the phase of the reference high-frequency signal is delayed by the phase shifter 709 is that among the detected high-frequency signal a component with 90-degree-delayed phase reflects the electrostatic capacity between the tips 701 and the recording medium 702 in comparison with the phase of the original high-frequency signal output from the high-frequency signal applying circuit 704. An output signal from the synchronous detector 708 is passed through an absolute-value circuit 710 and an averaging circuit 711. The resultant signal represents the electrostatic capacity, that is, the value of electrostatic capacity between the tips 701 and the recording medium 702, which is output as a reproduction signal.

Even if the surface resistance increases because of advance of oxidation in making the electric current flow through the recording medium in reproduction or because of advance of natural oxidation in the atmosphere, the detection with the high-frequency currents is possible, because the recording medium has a finite electrostatic capacity. The above method for detecting the electrostatic capacity realized the reproduction with high S/N ratio.

Figure 8:
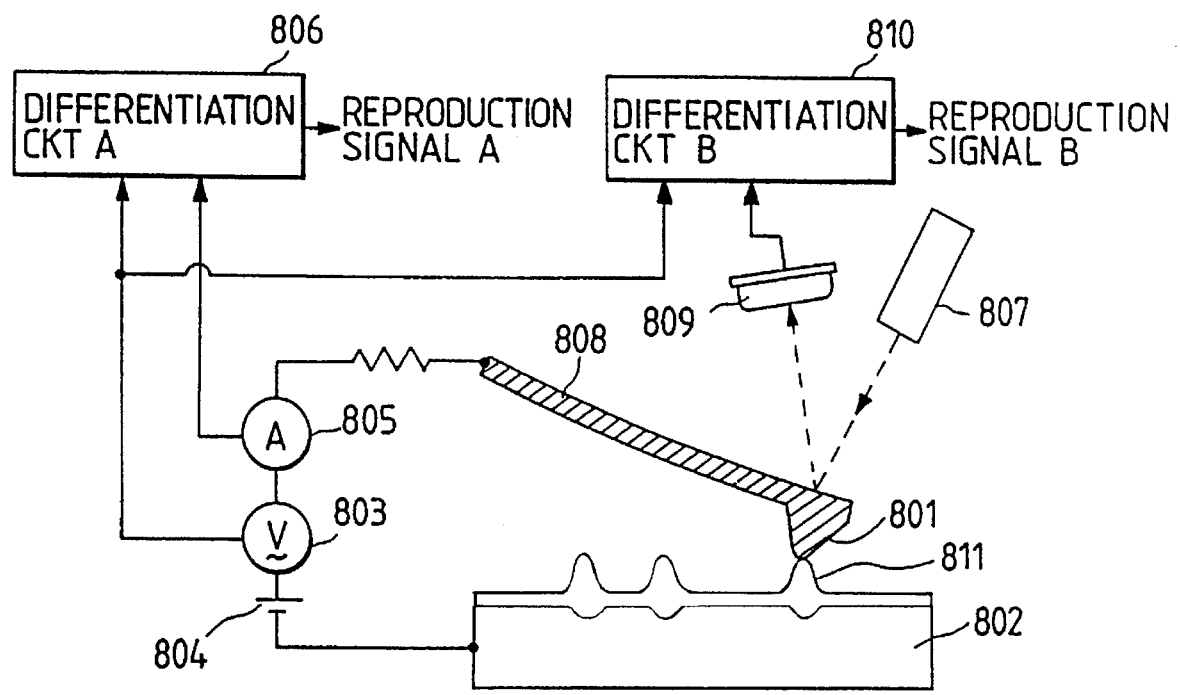
FIG. 8 is a drawing to illustrate the fifth embodiment of a reproducing method with high S/N ratio in the information recording and/or reproducing apparatus of the present invention.

The fifth reproduction method with high S/N ratio is so arranged, as shown in FIG. 8, that the bias voltage applied between the tips 801 and the recording medium 802 is modulated in reproduction and that first differential or second differential signals of the current detection signals or the projection shape detection signals with respect to the bias voltage are detected to reproduce information.

Specifically, a modulation bias voltage superimposed on a dc bias voltage is applied between the tips 801 and the recording medium 802 by a modulation bias voltage applying means 803 and a dc bias voltage applying means 804. Here, the amplitude of the dc bias voltage is about −1 V to +1 V, the amplitude of the modulation bias voltage is about 0.1 V, and the modulation frequency is about 100 kHz. Electric currents flowing between the tips 801 and the recording medium 802 are detected by an electric current detecting circuit 805, and current detection signals thereof are supplied to a differentiating circuit A (806). The differentiating circuit A (806) obtains first and second differentials of each current detection signal, based on the modulation bias voltage signal from the modulation bias voltage applying means 803, to output the thus obtained result as a reproduction signal A. The first differential of the current detection signal with the voltage represents the contact resistance of the surface of the recording medium 802, and the second differential of the current detection signal with the voltage represents the electron density of the surface. Since the local oxidation of the surface of the recording medium 802 advances in the portions of recording bits 811, the contact resistance and the electron density are different in the recorded portions from those in the non-recorded portions, which are reproducible by the first differential and second differential signals of the current detection signals with the voltage.

Further, a position detector 809 detects a position of a reflected light spot of the light projected from the laser 807 onto each tip of probe 808 and a projection shape detection signal output from the position detector 809 is supplied to a differentiating circuit B (810). The differentiating circuit B (810) obtains a second differential of each projection shape detection signal, based on the modulation bias voltage signal from the modulation bias voltage applying means 803, to output the thus obtained result as a reproduction signal B. A projection shape detection signal, i.e., an acting force detection signal acting between the tip 801 and the recording medium 802, includes a component of an electrostatic force acting between the tip 801 and the recording medium 802, so that the second differential of the electrostatic force with the voltage is proportional to the electrostatic capacity. As described previously, the electrostatic capacity changes in the portions of recording bits 811, and, therefore, reproduction is possible by the second differential signals of the projection shape detection signals with the voltage.

The method may be so arranged that the reproduction signals are obtained by combining the differential signals of the current detection signals with the differential signals of the projection shape detection signals as in the first reproduction method with high S/N ratio.

As described above, reproduction can be made based on the current signals under the conditions that the oxidation in reproduction is kept hardly to advance by modulating the bias voltage, thereby keeping the dc bias voltage smaller, and decreasing the value of the dc current flowing in the recording medium. Also, the electrostatic capacity can be detected based on the projection shape signal. Reproduction with high S/N ratio became possible by the above method.

Figure 9:
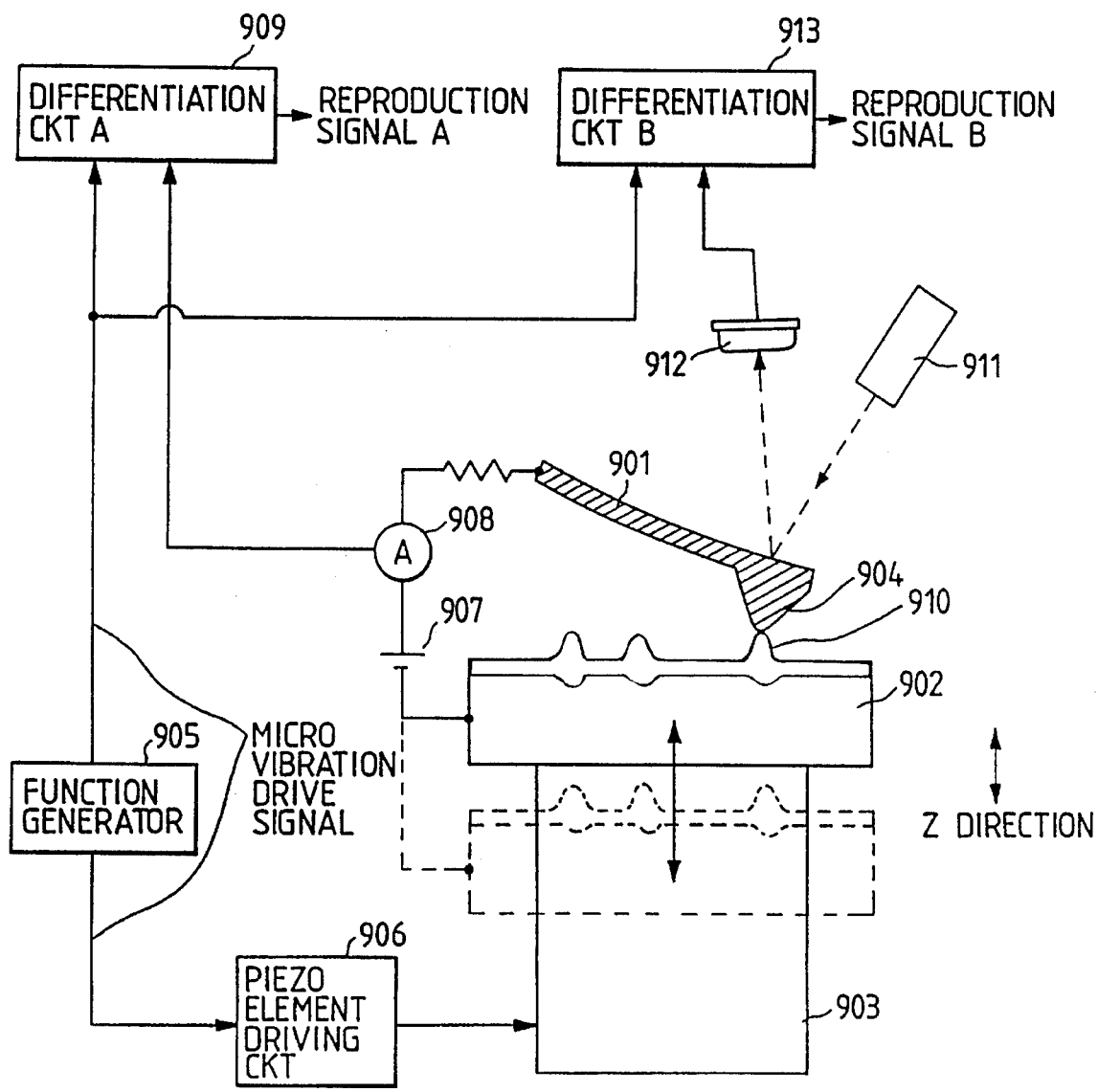
FIG. 9 is a drawing to illustrate the sixth embodiment of a reproducing method with high S/N ratio in the information recording and/or reproducing apparatus of the present invention.

The sixth reproduction method with high S/N ratio is so arranged, as shown in FIG. 9, that the recording medium 902 is finely vibrated in the direction perpendicular thereto while keeping the probes 901 in a contact state with or in a non-contact state with the recording medium 902 and that first differential signals of the current detection signals or the projection shape detection signals with respect to the fine vibration drive signal are detected to reproduce information.

Specifically, a piezo element 903 is attached to the recording medium 902 to vibrate it with fine amplitude of about 10 nm in the z-direction in FIG. 9. Clearances between the probes 901 and the recording medium 902 are so set that with the vibration the tips 904 can take a contact state or a non-contact state with the recording medium 902. The piezo element 903 is driven with application of a drive signal from a piezo element drive circuit 906, based on a signal from a function generator 905. Applying a bias voltage between the tips 904 and the recording medium 902 by a bias voltage applying means 907, electric currents flowing between the tips 904 and the recording medium 902 are detected by a current detecting circuit 908. Detected current signals are supplied to a differentiating circuit A (909). The differentiating circuit A (909) obtains a first differential of the each detected current signal with a signal synchronized with the piezo element drive signal from the function generator 905 to output the first differential as a reproduction signal A.

The first differential of a current detection signal with the z-direction fine vibration drive signal represents the work function of the surface of the recording medium 902. Since the local oxidation of the surface of the recording medium 902 advances in the portions of recording bits 910, the work function locally changes there as compared with that in the non-recorded portions, which is reproducible by the first differential signal of the current detection signal with the z-direction fine vibration drive signal.

Also, a position detector 912 detects a position of a reflected light spot of the light projected from a laser 911 onto each tip of probe 901 and projection shape detection signals output from the position detector 912 are supplied to a differentiating circuit B (913). The differentiating circuit B (913) obtains a first differential of each projection shape detection signal with the signal synchronized with the piezo element drive signal from the function generator 905 to output the first differential as a reproduction signal B.

The first differential of a projection shape detection signal with the fine vibration drive signal represents the Young's modulus of the surface of the recording medium 902. Since the surface of the recording medium 902 is an oxide in the portions of recording bits 910, the Young's modulus of the surface of the recording medium 902 locally changes in the recorded portions as compared with that in the non-recorded portions, which is reproducible by the first differential signal of the projection shape detection signal with the z-direction fine vibration drive signal.

The method may be so arranged that the reproduction signals are obtained by combining the differential signals of the current detection signals with the differential signals of the projection shape detection signals as in the first reproduction method with high S/N ratio.

Modulating the clearance between the tips and the recording medium as described above, detection is possible with a difference in work function of the surface of the recording medium, based on the current detection signals. Also, detection is possible with a difference in Young's modulus of the surface of the recording medium, based on the projection shape signals. In either case, the recording bits are able to be accurately discriminated from simple asperities on the surface of the recording medium, thus enabling reproduction with high S/N ratio.

Figure 10:
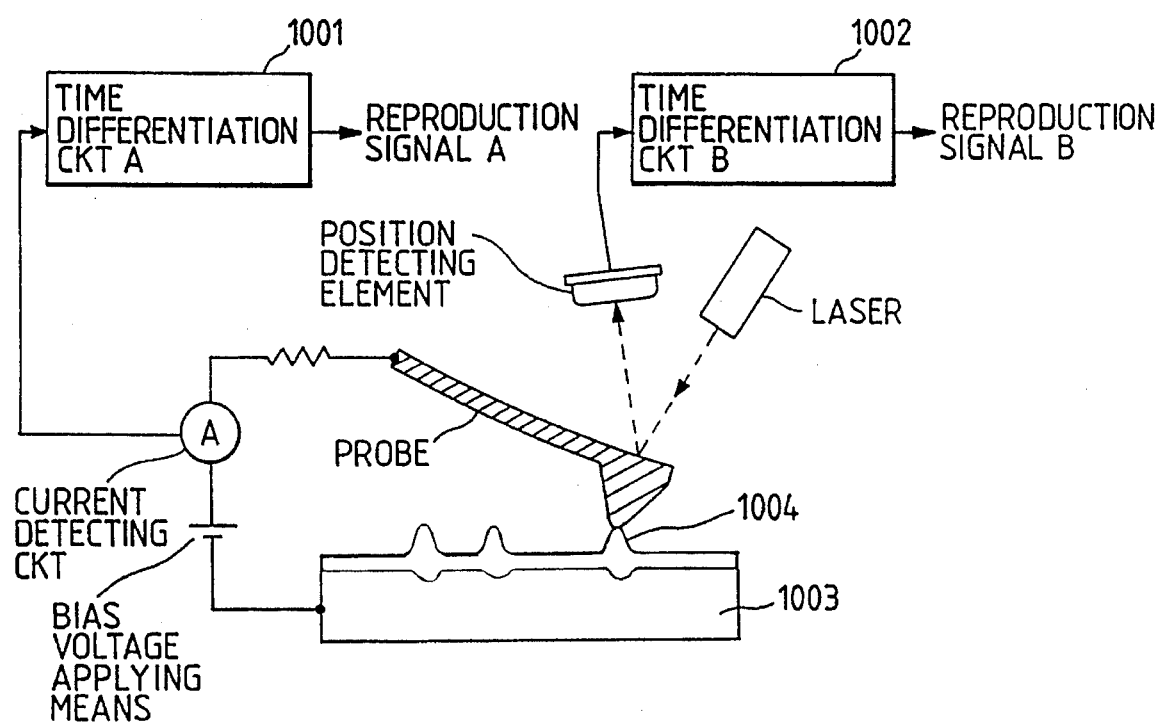
FIG. 10 is a drawing to illustrate the seventh embodiment of a reproducing method with high S/N ratio in the information recording and/or reproducing apparatus of the present invention.

The seventh reproduction method with high S/N ratio is so arranged, as shown in FIG. 10, that reproduction is made with time differentials of the current detection signals or the projection shape detection signals.

Specifically, current signals detected by a current detecting circuit similarly as in the previous embodiments are supplied to a time-differentiating circuit A (1001). The time-differentiating circuit A (1001) obtains a time differential of each detected current signal and outputs it as a reproduction signal A. Since a detected current decreases in a portion of recording bit 1004 on the recording medium 1003, values (signs) of reproduction signal A change from zero, via minus, via plus, then to zero in the order. Since the size of recording bits and a relative scanning speed between the tips and the recording medium are preliminarily known, a time change of the values (signs) of reproduction signal A in detecting the recording bits is also known, whereby the recording bits can be detected.

The projection shape detection signals output from the position detector are supplied to a time differentiating circuit B (1002). The time differentiating circuit B (1002) obtains a time differential of each projection shape detection signal to output it as a reproduction signal B. Since a portion of recording bit 1004 on the recording medium 1003 has the shape of a projection, values (signs) of reproduction signal B change from zero, via plus, via minus, then to zero in the order. Since the size of recording bits and the relative scanning speed between the tips and the recording medium are preliminarily known, a time change of the values (signs) of reproduction signal B in detecting the recording bits is also known, whereby the recording bits can be detected.

This method may be so arranged that reproduction signals are obtained by combining the differential signals of current detection signals with the differential signals of projection shape detection signals, similarly as in the first reproduction method with high S/N ratio.

The value of contact resistance of the surface of the recording medium 1003 largely changes depending upon the thickness of the oxide film and the contamination deposited on the tip surface. Consequently, values of currents flowing in the non-recorded portions also greatly change. It is thus difficult to set a threshold value of current below which a flowing current is determined as representing a recording bit, in detecting the recording bits 1004. By the above-described arrangement in which the recording bits are detected by the time-differential signals of the current detection signals, the recording bits can be detected irrespective of absolute values of the detected currents.

Since the heights of the projection shape of the recording bits 1004 are not always far greater than the asperities of the surface of the recording medium 1003, it is difficult to set a threshold value of height of projection shape above which a height of the projection shape is determined as representing a recording bit, in detecting the recording bits 1004. By the above-described arrangement in which the recording bits are detected by the time-differential signals of the projection shape detection signals, the recording bits can be detected irrespective of magnitudes of the projection shape detection signals.

The above method of reproduction by the time differentials of the current detection signals or the projection shape detection signals realized reproduction with high S/N ratio.

Figure 11:
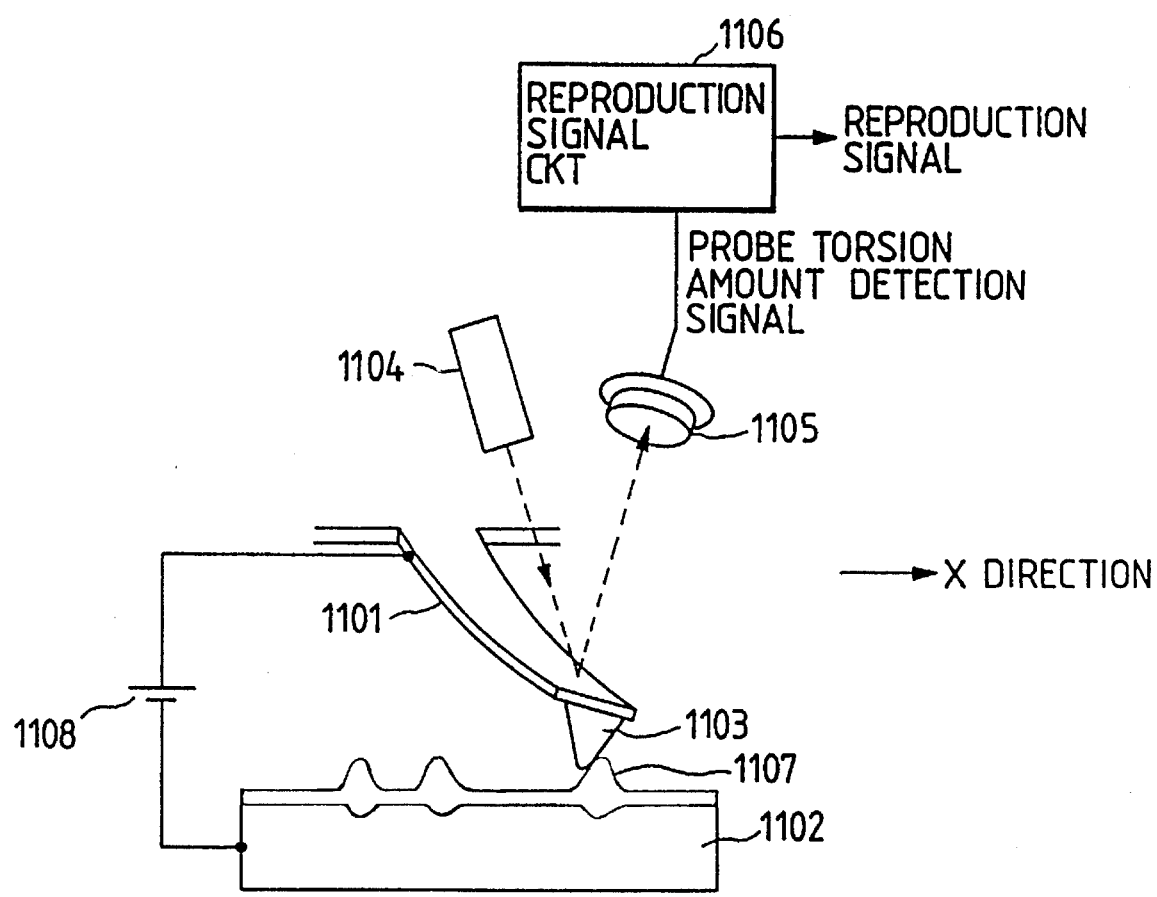
FIG. 11 is a drawing to illustrate the eighth embodiment of a reproducing method with high S/N ratio in the information recording and/or reproducing apparatus of the present invention.

The eighth reproduction method with high S/N ratio is so arranged, as shown in FIG. 11, that in relative scan between the probes 1101 and the recording medium 1102, reproduction is carried out by detecting an amount of torsion of each probe 1101 due to a force acting in the direction of the relative scan, for example, due to a frictional force acting on the tip 1103.

Specifically, light from the laser 1104 is guided to impinge on the tip of probe 1101 and a position detector 1105 detects a position of a spot of reflected light therefrom. Here, the direction of the relative scan in reproduction between the probes 1101 and the recording medium 1102 is arranged as perpendicular to the probes 1101, and the direction of position detection by the position detector 1105 is shifted 90° from the direction shown in FIG. 3 to FIG. 10 so that an amount of torsion can be detected instead of an amount of deflection of the probes 1101. Probe torsion amount detection signals are supplied to a reproduction signal circuit 1106, which outputs the signals as reproduction signals.

While the probes 1101 are moved relative to the recording medium 1102 in the x-direction in the drawing, the projection shape of recording bit 1107 causes an x-directional force to be exerted on the tip of tip 1103, thus causing torsion of probes 1101. Accordingly, reproduction of recording bit 1107 can be made by detecting an amount of the torsion.

In the relative scan with application of a bias voltage between the tips 1103 and the recording medium 1102 by a bias voltage applying means 1108, an electrostatic force acting between the tips 1103 and the recording medium 1102 decreases because the electrostatic capacity decreases in the portions of recording bits 1107. As a result, a frictional force acting in the x-direction in the drawing between the tips 1103 and the recording medium 1102 also decreases, resulting in decreasing the amount of torsion in the portions of recording bits 1107. Accordingly, reproduction of the recording bits 1107 can be made by detecting the amount of torsion.

By the above arrangement in which reproduction is made by detecting the force acting in the scan direction on the recording bits 1107 during the relative scan between the tips 1103 and the recording medium 1102, reproduction with high S/N ratio was realized.

As detailed above, the present invention involves such an arrangement that the recording medium is made of a material which oxidizes with a flow of electric current in the atmosphere to form a projection and also to locally increase the contact resistance, that information is recorded with a flow of electric current while keeping the probes in contact with the recording medium, and that an increase in contact resistance of the surface of the recording medium is detected by detecting the shape of the projection utilizing the principle of AFM or by detecting electric currents flowing between the probes and the recording medium.

As a result, the tips and the recording medium were prevented from being broken by the electric current flowing in recording, and the tips were prevented from being contaminated. Thus, the resolving power of the tips of the probes was enhanced and the reliability in recording and reproduction was improved.

What is claimed is:

1. An information recording and/or reproducing apparatus which records and reproduces information with a probe, said apparatus comprising:

a probe made of an elastic body;

a recording medium which oxidizes in a portion where an electric current flows in the atmosphere to form a recording bit;

means for moving said probe relative to said recording medium;

means for applying a recording voltage between said probe and said recording medium for forming the recording bit; and means for detecting an amount of deformation of said probe during the relative movement in order to reproduce the recording bit.

2. The apparatus according to claim 1, further comprising:

means for changing a clearance between said probe and said recording medium; and means for calculating a first order differential signal of an output signal from said means for detecting an amount of deformation;

wherein the recording bit is reproduced on a basis of the calculated first order differential signal.

3. The apparatus according to claim 1, further comprising:

means for calculating a time-differential signal of an output signal from said means for detecting an amount of deformation;

wherein the recording bit is reproduced on a basis of the calculated time-differential signal.

4. The apparatus according to claim 1, further comprising:

means for applying a modulated reproduction voltage between said probe and said recording medium; and means for calculating a second order differential signal of an output signal from said means for detecting an amount of deformation;

wherein the recording bit is reproduced on a basis of the calculated second order differential signal.

5. The apparatus according to claim 1, wherein said means for detecting an amount of deformation of said probe detects an amount of torsion of said probe.

6. An information recording and/or reproducing apparatus which records and reproduces information with a probe, said apparatus comprising:

a probe;

a recording medium which oxidizes in a portion where an electric current flows in the atmosphere to form a recording bit;

means for moving said probe relative to said recording medium;

means for applying a recording voltage between said probe and said recording medium for forming the recording bit;

means for applying a reproduction voltage between said probe and said recording medium; and means for detecting an electric current flowing between said probe and said recording medium when the reproduction voltage is applied therebetween in order to reproduce the recording bit.

7. The apparatus according to claim 6, further comprising:

means for changing a clearance between said probe and said recording medium so that said probe takes a contact state and a non-contact state with said recording medium;

wherein said means for detecting an electric current detects the electric current flowing between said probe and said recording medium in synchronization with a contact of said probe with said recording medium.

8. The apparatus according to claim 6, wherein said means for applying a reproduction voltage applies a pulse voltage between said probe and said recording medium, and wherein said means for detecting an electric current detects the current flowing between said probe and said recording medium in synchronization with the applied pulse voltage.

9. The apparatus according to claim 6, wherein said means for applying a reproduction voltage applies a low voltage and a high-frequency signal between said probe and said recording medium, and wherein said means for detecting an electric current detects an electric current flowing between said probe and said recording medium in synchronization with a reference signal obtained by phase-shifting the high-frequency signal.

10. The apparatus according to claim 6, further comprising:

means for calculating a first or second order differential signal of an output signal from said means for detecting an electric current;

wherein said means for applying a reproduction voltage applies a modulated voltage between said probe and said recording medium, and wherein the recording bit is reproduced on a basis of the calculated first or second order differential signal.

11. The apparatus according to claim 6, further comprising:

means for changing a clearance between said probe and said recording medium; and means for calculating a first order differential signal of an output signal from said means for detecting an electric current;

wherein the recording bit is reproduced on a basis of the calculated first order differential signal.

12. The apparatus according to claim 6, further comprising:

means for calculating a time-differential signal of an output signal from said means for detecting an electric current;

wherein the recording bit is reproduced on a basis of the calculated time-differential signal.

13. The apparatus according to claim 6, further comprising:

means for detecting an amount of deformation of said probe during the relative movement;

wherein reproduction of the recording bit is carried out based on both an output signal from said means for detecting an electric current and an output signal from said means for detecting an amount of deformation.

14. An information reproducing apparatus which reproduces information from a recording medium with a probe, said apparatus comprising:

a probe made of an elastic body;

means for moving said probe relative to the recording medium;

means for detecting an amount of deformation of said probe during the relative movement in order to reproduce a recording bit;

means for changing a clearance between said probe and the recording medium; and means for calculating a first order differential signal of an output signal from said means for detecting an amount of deformation;

wherein the recording bit is reproduced on a basis of the calculated first order differential signal.

15. An information reproducing apparatus which reproduces information from a recording medium with a probe, said apparatus comprising:

a probe made of an elastic body;

means for moving said probe relative to the recording medium;

means for detecting an amount of deformation of said probe during the relative movement in order to reproduce a recording bit; and means for calculating a time-differential signal of an output signal from said means for detecting an amount of deformation;

wherein the recording bit is reproduced on a basis of the calculated time-differential signal.

16. An information reproducing apparatus which reproduces information from a recording medium with a probe, said apparatus comprising:

a probe made of an elastic body;

means for moving said probe relative to the recording medium;

means for detecting an amount of deformation of said probe during the relative movement in order to reproduce a recording bit;

means for applying a modulated reproduction voltage between said probe and the recording medium; and means for calculating a second order differential signal of an output signal from said means for detecting an amount of deformation;

wherein the recording bit is reproduced on a basis of the calculated second order differential signal.

17. An information reproducing apparatus which reproduces information from a recording medium with a probe, said apparatus comprising:

a probe;

means for moving said probe relative to the recording medium;

means for applying a reproduction voltage between said probe and the recording medium;

means for detecting an electric current flowing between said probe and the recording medium when the reproduction voltage is applied therebetween in order to reproduce a recording bit;

means for changing a clearance between said probe and the recording medium so that said probe takes a contact state and a non-contact state with the recording medium;

wherein said means for detecting an electric current detects the electric current flowing between said probe and the recording medium in synchronization with a contact of said probe with the recording medium.

18. An information reproducing apparatus which reproduces information from a recording medium with a probe, said apparatus comprising:

a probe;

means for moving said probe relative to the recording medium;

means for applying a reproduction voltage between said probe and the recording medium; and means for detecting an electric current flowing between said probe and the recording medium when the reproduction voltage is applied therebetween in order to reproduce a recording bit;

wherein said means for applying a reproduction voltage applies a pulse voltage between said probe and the recording medium, and wherein said means for detecting an electric current detects the current flowing between said probe and the recording medium in synchronization with the applied pulse voltage.

19. An information reproducing apparatus which reproduces information from a recording medium with a probe, said apparatus comprising:

a probe;

means for moving said probe relative to the recording medium;

means for applying a reproduction voltage between said probe and the recording medium; and means for detecting an electric current flowing between said probe and the recording medium when the reproduction voltage is applied therebetween in order to reproduce a recording bit;

wherein said means for applying a reproduction voltage applies a low voltage and a high-frequency signal between said probe and the recording medium, and wherein said means for detecting an electric current detects an electric current flowing between said probe and the recording medium in synchronization with a reference signal obtained by phase-shifting the high-frequency signal.

20. An information reproducing apparatus which reproduces information from a recording medium with a probe, said apparatus comprising:

a probe;

means for moving said probe relative to the recording medium;

means for applying a reproduction voltage between said probe and the recording medium;

means for detecting an electric current flowing between said probe and the recording medium when the reproduction voltage is applied therebetween in order to reproduce a recording bit; and means for calculating a first or second order differential signal of an output signal from said means for detecting an electric current;

wherein said means for applying a reproduction voltage applies a modulated voltage between said probe and the recording medium, and wherein the recording bit is reproduced on a basis of the calculated first or second order differential signal.

21. An information reproducing apparatus which reproduces information from a recording medium with a probe, said apparatus comprising:

a probe;

means for moving said probe relative to the recording medium;

means for applying a reproduction voltage between said probe and the recording medium;

means for detecting an electric current flowing between said probe and the recording medium when the reproduction voltage is applied therebetween in order to reproduce a recording bit;

means for changing a clearance between said probe and the recording medium; and means for calculating a first order differential signal of an output signal from said means for detecting an electric current;

wherein the recording bit is reproduced on a basis of the calculated first order differential signal.

22. An information reproducing apparatus which reproduces information from a recording medium with a probe, said apparatus comprising:

a probe;

means for moving said probe relative to the recording medium;

means for applying a reproduction voltage between said probe and the recording medium;

means for detecting an electric current flowing between said probe and the recording medium when the reproduction voltage is applied therebetween in order to reproduce a recording bit; and means for calculating a time-differential signal of an output signal from said means for detecting an electric current;

wherein the recording bit is reproduced on a basis of the calculated time-differential signal.

23. An information reproducing apparatus which reproduces information from a recording medium with a probe, said apparatus comprising:

a probe;

means for moving said probe relative to the recording medium;

means for applying a reproduction voltage between said probe and the recording medium;

means for detecting an electric current flowing between said probe and the recording medium when the reproduction voltage is applied therebetween in order to reproduce a recording bit; and means for detecting an amount of deformation of said probe during the relative movement;

wherein reproduction of the recording bit is carried out based on both an output signal from said means for detecting an electric current and an output signal from said means for detecting an amount of deformation.

* * * * *

UNITED STATES PATENT AND TRADEMARK OFFICE
CERTIFICATE OF CORRECTION

PATENT NO. : 5,546,374
DATED : August 13, 1996
INVENTOR(S) : Kuroda et al.

It is certified that error appears in the above-indentified patent and that said Letters Patent is hereby corrected as shown below:

COLUMN 1:

Line 65, "caused" should read --causes--.

COLUMN 4:

Line 42, "si" should read --Si--.

COLUMN 5:

Line 9, "chances" should read --changes--; and
Line 20, "ducing-apparatus" should read --ducing apparatus--.

COLUMN 7:

Line 66, "the both" should read --both--.

COLUMN 8:

Line 61, "As-a" should read --As a--.

UNITED STATES PATENT AND TRADEMARK OFFICE
CERTIFICATE OF CORRECTION

PATENT NO. : 5,546,374
DATED : August 13, 1996
INVENTOR(S) : Kuroda et al.

It is certified that error appears in the above-indentified patent and that said Letters Patent is hereby corrected as shown below:

COLUMN 9:

Line 36, "the reproduction" should read --reproduction--.

COLUMN 10:

Line 58, "the each" should read --each--.

Signed and Sealed this

Eighteenth Day of March, 1997

Attest:

BRUCE LEHMAN

Attesting Officer          Commissioner of Patents and Trademarks